US006532554B1

(12) United States Patent
Kakadia

(10) Patent No.: US 6,532,554 B1
(45) Date of Patent: Mar. 11, 2003

(54) NETWORK EVENT CORRELATION SYSTEM USING FORMALLY SPECIFIED MODELS OF PROTOCOL BEHAVIOR

(75) Inventor: Deepak K. Kakadia, Union City, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/450,296

(22) Filed: Nov. 29, 1999

(51) Int. Cl.[7] .................................................. G06F 11/00
(52) U.S. Cl. .......................................... 714/43; 714/47
(58) Field of Search ............................. 714/43, 26, 25, 714/48, 47

(56) References Cited

U.S. PATENT DOCUMENTS

| | | | |
|---|---|---|---|
| 5,473,596 A | | 12/1995 | Garafola et al. |
| 5,528,516 A | | 6/1996 | Yemini et al. ......... 364/551.01 |
| 5,539,877 A | | 7/1996 | Winokur et al. ....... 395/183.02 |
| 5,661,668 A | | 8/1997 | Yemini et al. .............. 364/550 |
| 5,777,549 A | * | 7/1998 | Arrowsmith et al. ....... 340/506 |
| 6,017,143 A | * | 1/2000 | Eryurek et al. ............... 700/51 |
| 6,049,828 A | * | 4/2000 | Dev et al. ................... 709/220 |
| 6,208,955 B1 | * | 3/2001 | Provan et al. ................ 703/20 |
| 6,360,333 B1 | * | 3/2002 | Jansen et al. ............... 709/202 |

OTHER PUBLICATIONS

Kakadia, Deepak, Design and Implementation of a Network Protocol Diagnostic and Performance Analysis Engine Using Formal Methods.
Kakadia, Deepak, Event Correlation: A Formal Methods Based Approach, 2000 IEEE/IFIP Network Operations and Management Symposium Apr. 10–14, 2000, Hilton Hawaiian Village, Honolulu, Hawaii, pp. 1–12.
ILOG Rules, White Paper, Thomson CSF, Mar. 1997, pp. 1–30.
InCharge Distributed Event Management Architecture.
Ohsie, D., Mayer, A., Kliger, S., and Yemini, S., Event Modeling with the Model Language: A Tutorial Introduction, pp. 1–14.
Hinchey, Michael G. and Jarvis, Stephen A., Protocol Specification & Verification Methods: An Overview.
Hinchey, Michael G. and Jarvis, Stephen A., Concurrent Systems: Formal Development in CSP, The McGraw–Hill International Series in Software Engineering, 1995, pp. 7–97, pp. 100–106.
Lehmann, A. et al., Knowledge–Based Alarm Surveillance for TMN, IEEE, vol. CONF. 15, Mar. 27, 1996, pp. 494–500.
Gardner, Robert D., Methods and Systems for Alarm Correlation, IEEE, vol. 1, 11/96, pp. 136–140.
Intelligent filtering in network management systems, Moller, Tretter, Fink pp. 304–315.
Event Correlation using Rule & Object Based Techniques, Y.A. Nygate pp. 278–284.
Towards a Practical Alarm Correlation System, K. Houck, S. Calo, A. Finkel pp. 226–237.
A Coding Approach to Event Correlation, S. Kliger, S. Yemini pp. 265–277.

* cited by examiner

Primary Examiner—Robert Beausoliel
Assistant Examiner—Marc Duncan
(74) Attorney, Agent, or Firm—Steven K. Barton; William J. Kubida; Hogan & Hartson LLP

(57) ABSTRACT

An event correlation system for network management has computer code for at least one model of a process to be run on a node of a network, where said process is intended to be run on a different node of the network than the model. The correlation system also has code for an alarm monitor comparing the apparent behavior of the model to actual events generated by the process and generating alarm messages when the actual events of the process do not match expected events from the model. It also has code for an event correlation utility; and means for communicating alarms from the alarm monitor to the event correlation utility.

19 Claims, 4 Drawing Sheets

NETWORK EVENT CORRELATION SYSTEM USING FORMALLY SPECIFIED MODELS OF PROTOCOL BEHAVIOR

FIELD OF THE INVENTION

The invention relates to the field of network administration, and in particular to the field of software tools for assisting network management through diagnosis of network problems so that appropriate enhancements and repairs may be made.

BACKGROUND OF THE INVENTION

Many voice and data networks occasionally have problems. These problems may include a noisy or failed link, an overloaded link, a damaged cable, repeater, switch, router, or channel bank causing multiple failed links, a crashed server or an overloaded server; a link being a channel interconnecting two or more nodes of the network. Networks may also have software problems, a packet may have an incorrect format, be excessively delayed, or packets may arrive out of order, be corrupt, or missing. Routing tables may become corrupt, and critical name-servers may crash. Problems may be intermittent or continuous. Intermittent problems tend to be more difficult to diagnose than continuously present problems.

Networks are often distributed over wide areas, frequently involving repeaters, wires, or fibers in remote locations, and involve a high degree of concurrency. The wide distribution of network hardware and software makes diagnosis difficult because running diagnostic tests may require extensive travel delay and expense.

Many companies operating large networks have installed network operations centers where network managers monitor network activity by observing reported alarms. These managers attempt to relate the alarms to common causes and dispatch appropriate repair personnel to the probable location of the fault inducing the alarms.

Y. Nygate, in *Event Correlation using Rule and Object Based Techniques*, Proceeding of the fourth international symposium on integrated network management, Chapman & Hall, London, 1995, pp 279 to 289, reports that typical network operations centers receive thousands of alarms each hour. This large number of alarms results because a single fault in a data or telecommunications network frequently induces the reporting of many alarms to network operators. For example, a failed repeater may cause alarms at the channel banks, nodes, or hosts at each end of the affected link through the repeater, as well as alarms from the switches, routers, and servers attempting to route data over the link. Each server may also generate alarms at the hardware level and at various higher levels; for example a server running TCP-IP on Ethernet may generate an Ethernet level error, then at the IP level, then at the TCP level, and again at the application level.

Alarms from higher levels of protocol may be generated by network nodes not directly connected to a problem node. For example, alarms may arise from a TCP or application layer on node A of a network, where node A connects only to node B, which routes packets on to node C, when C's connection to node D fails, where node D was being used by an application on node A.

Alarms may be routed to a network management center through the network itself, if sufficient nodes and links remain operational to transport them, or through a separate control and monitor data network. The telephone network, for example, frequently passes control information relating to telephone calls—such as the number dialed and the originating number—over a control and monitor data network separate from the trunks over which calls are routed. It is known that many networks have potential failure modes such that some alarms will be unable to reach the network management center.

Loss of one link may cause overloading of remaining links or servers in the network, causing additional alarms for slow or denied service. The multitude of alarms can easily obscure the real cause of a fault, or mask individual faults in the profusion of alarms caused by other problems. This phenomenon increases the skill, travel, and time needed to resolve failures.

The number of alarms reported from a single fault tends to increase with the complexity of the network, which increases at a rate greater than linear with the increase in the number of nodes. For example the complexity of the network of networks known as the Internet, and the potential for reported faults, increases exponentially with the number of servers and computers connected to it, or to the networks connected to the Internet.

Event correlation is the process of efficiently determining the occurrence of and the source of problems in a complex system or network based on observable events.

Yemini, in U.S. Pat. No. 5,661,668, used a rule-based expert system for event correlation. The approach of Yemini requires construction of a causality matrix, which relates observable symptoms to likely problems in the system. A weakness of this approach is that a tremendous amount of expertise is needed to cover all cases and, as the number of network nodes, and therefore the number of permutations and combinations increase, the complexity of the causality matrix increases exponentially.

A first node in a network may run one or several processes. These processes run concurrently with, and interact with, additional processes running on each node with which the first node communicates.

One of the small minority of computer languages capable of specifying and modeling multiple concurrent processes and their interactions is C. A. R. Hoare's Communicating Sequential Processes, or "CSP", as described in M. Hinchey and S. Jarvis, Concurrent Systems: Formal Development in CSP, The McGraw-Hill International Series in Software Engineering, London, 1995. The CSP language allows a programmer to formally describe the response of processes to stimuli and how those processes are interconnected. It is known that timed derivatives of CSP can be used to model network processes, Chapter 7 of Hinchey, et al., proposes using a CSP model to verify a reliable network protocol.

Timed CSP processes may be used to model network node behavior implemented as logic gates as well as processes running on a processor in a network node. For purposes of this application, a process running on a network node may be implemented as logic gates, as a process running in firmware on a microprocessor, microcontroller, or CPU chip, or as a hybrid of the two.

Other languages that provide for concurrency may be used to model network node behavior. For example, Verilog and VHDL both provide for concurrent execution of multiple modules and for communication between modules. Further, Occam incorporates an implementation of Timed CSP.

With the recent and continuing expansion of computing, data communications, and communications networks, the volume of repetitive, duplicate, and superfluous alarm messages reaching network operations centers makes understanding root causes of network problems difficult, and has potential to overwhelm system operators. It is desirable that these alarm messages be automatically correlated to make root causes of network problems more apparent to the operators than with prior event correlation tools.

SUMMARY OF THE INVENTION

Each node A in a network has a model, based upon a formal specification written in a formal specification language such as a timed derivative of CSP, of the expected behavior of each node B to which it is connected. Each node of the network also has an alarm monitor, again written in a formal specification language, which monitors at least one process running on that node. The model or models of expected behavior of each node B is compared with the actual responses of each node B by an additional alarm monitor.

Alarms from the alarm monitors are filtered by a local alarm filter in the node, such that the node reports what it believes to be the root cause of a failure to a network management center. In this way the number of meaningless alarms generated and reported to the network management center is reduced and the accuracy of the alarms is improved.

Alarms reported to the network management center are filtered again by an intelligent event correlation utility to reduce redundant fault information before presentation to network administration staff.

The foregoing and other features, utilities and advantages of the invention will be apparent from the following more particular description of a preferred embodiment of the invention as illustrated in the accompanying drawings.

DETAILED DESCRIPTION OF THE PREFERRED EMBODIMENT

Figure 1:
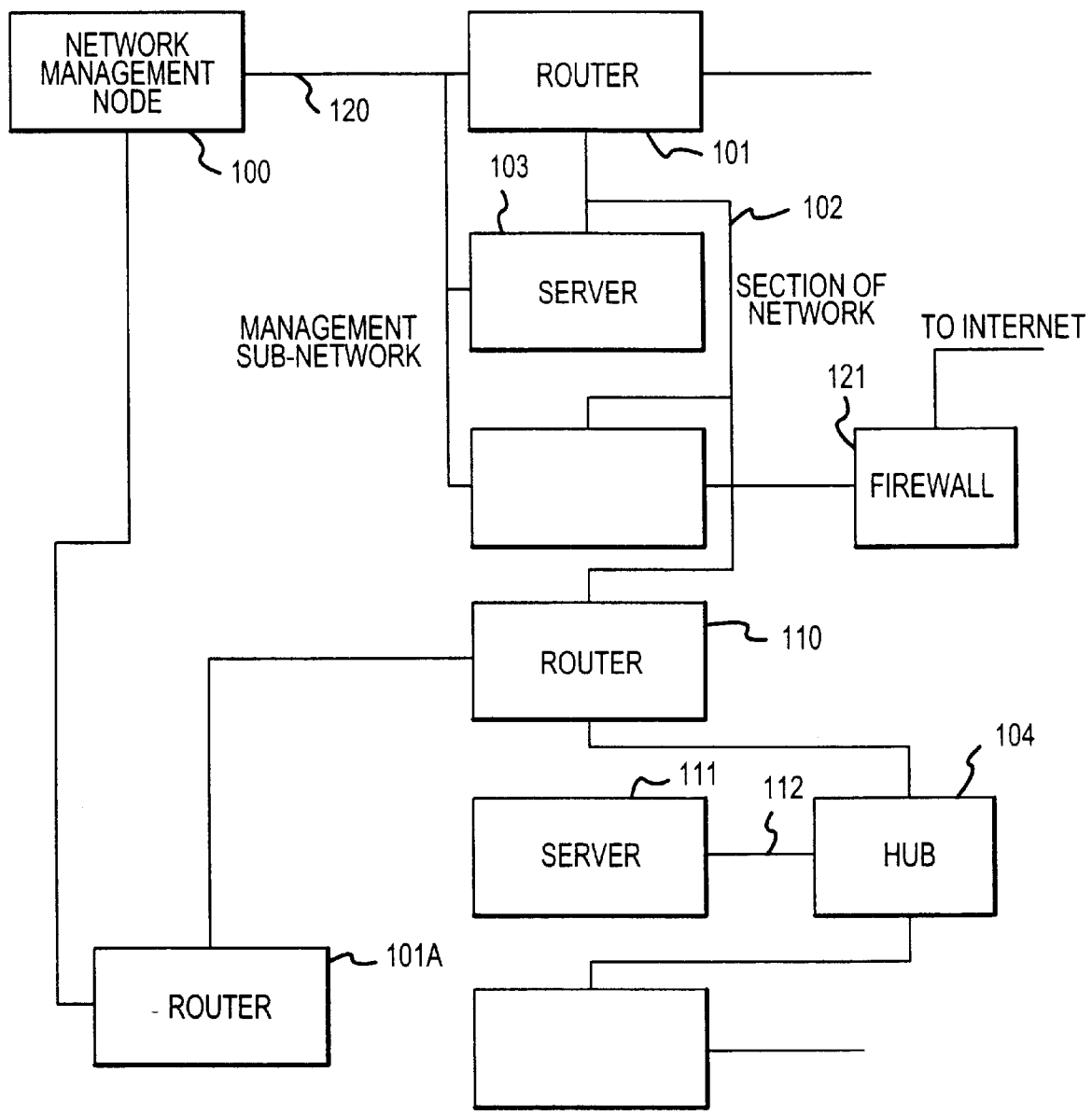
FIG. 1 illustrates a network of computers for which an event correlation system may be useful.

Typically, large data networks have at least one network management node 100 (FIG. 1), connected into the network at one or more points. The network may have one or more routers 101, 101A, and 110 capable of passing packets between separate sections of network 102, one or more servers 103 and 111 and one or more hubs 104. Failure of a router 110, a link 112 or of a hub 104, can cause isolation of particular servers 111 or user workstations (not shown) from the network, causing loss or degradation of service to users.

It is often desired that failures be reported through alarm messages to the network management node 100, so that corrective action may be taken and service restored quickly. Failed hardware is not always capable of sending alarm messages, failures need often be inferred through alarm messages generated by operating nodes affected by the failure. For example, should link 112 fail, hub 104 may report a loss of communication with server 111. Additionally, other nodes 103 that were communicating with the now-isolated server 111 may report loss of communication or that server 111, who may be a critical name server for Internet communications, is no longer reachable.

To reduce the likelihood that a functioning server will be unable to forward error messages to the network management station 100, some networks are organized with a separate management sub-network 120 for diagnostic, management, and control messages, which sub-network often operates at a lower speed than many of the data links of the network. For example, should node 103 detect a failure of a network adapter that connects it to data network segment 102, it may be possible for an error message from node 103 to reach the network management station 100 by way of the management sub-network 120.

Many networks interconnect with the Internet through one or more firewall or other dedicated routing and filtering nodes 121.

Figure 2:
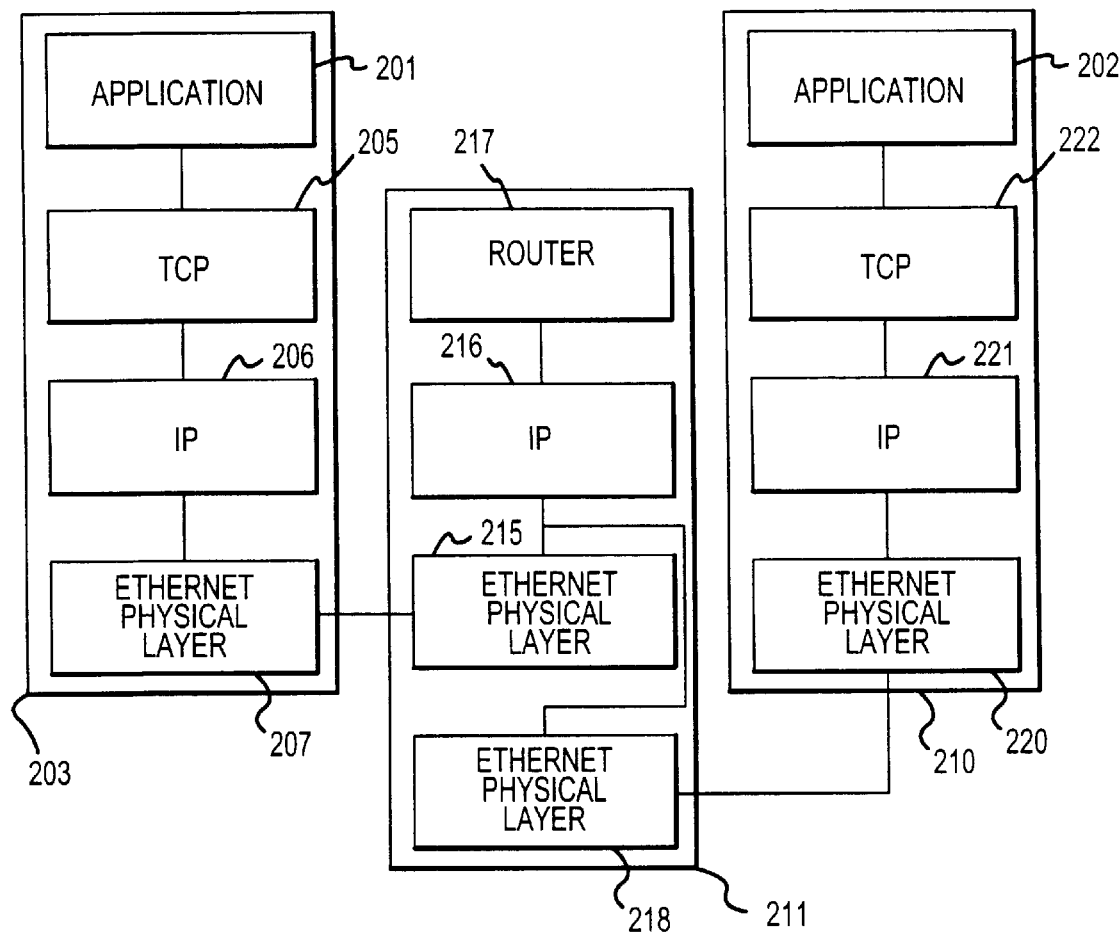
FIG. 2, a diagram of the hierarchy of network protocol processes running on a processor node of a network, as is known in the prior art.

An application 201 (FIG. 2) running on a first network node 203 typically communicates with the network through several layers of network protocol. When application 201 requests communication with a second application 202 on another network node 210, it passes requests to a top layer of network protocol handler, which may be a TCP protocol handler 205. This layer modifies, and encapsulates, the request into another level of request passed to a lower level protocol handler, which may be an IP handler 206; which in turn modifies and encapsulates the request into a packet passed on to a physical layer protocol handler, which may be an Ethernet physical layer handler 207. Other physical layer handlers may also be used for any available computer interconnection scheme, including but not limited to CI, Fiber channel, 100-BaseT, 10-BaseT, a T-1 line, a DSL line, ATM, Token Ring, or through a modem onto an analog phone line. Some network technologies are known to utilize seven or more layers of protocol handlers between an application process and the physical link. Other protocols than TCP-IP may be used, including IPX-SPX and NetBEUI, it is common for routers to translate protocols so that systems from different vendors may communicate with each other.

The physical layer link may connect directly or through a hub to the node 210, on which the target application 202 runs, or may frequently be passed through a router 211 or firewall. A firewall is a special case of a router in that packets are filtered in addition to being passed between network segments. In router 211, the packet is received through a physical layer handler, here Ethernet handler 215, which passes the packet to an IP protocol handler 216 that decodes the IP address of the packet. The IP address is then mapped by a routing module 217 to determine where the packet should next be sent, the packet is then modified as needed and returned through an IP protocol handler 216 to a physical layer handler 218.

When the packet reaches the node 210 on which the target application 202 runs, the packet is similarly processed through a physical layer handler 220, then through higher levels of protocol handler including IP and TCP handlers 221 and 222 before being passed to the target application 202.

Figure 3:
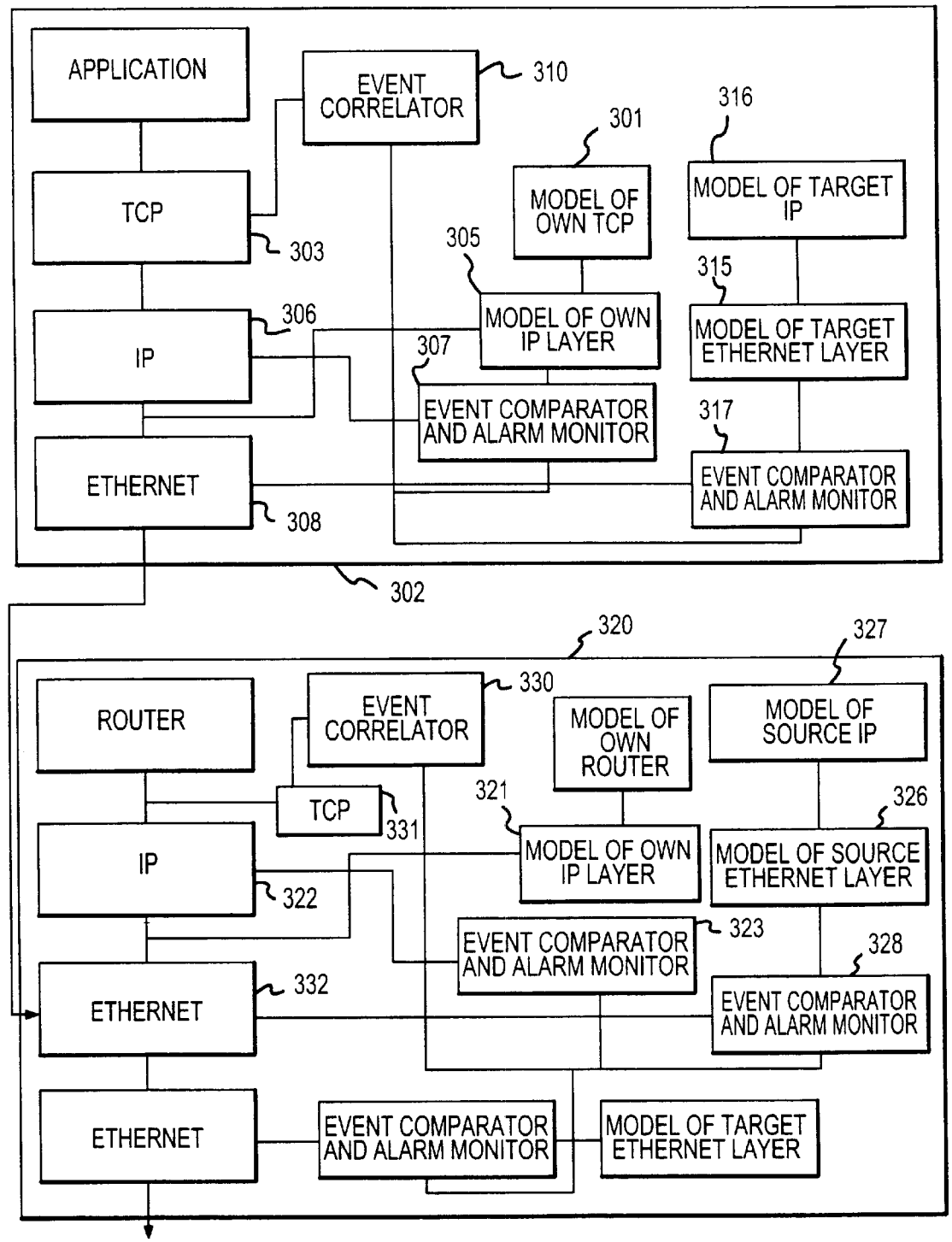
FIG. 3, a diagram illustrating a hierarchy of protocol processes running on a processor node and a router node of a network, having a formal model of behavior of additional nodes, alarm monitors for protocol layers, and an alarm filter as per the current invention.

In a preferred embodiment, the protocol handlers 205, 206, and 207 of the first network node 203 have been instrumented to provide state information to drive a formally specified model 301 (FIG. 3) of the node's 302 own TCP protocol layer 303. Similarly, the protocol handlers have been instrumented to drive a formally specified model 305 of the node's own IP layer 306. An event comparator and alarm monitor 307 compares signals passed between the TCP 303, IP 306, and Ethernet 308 handlers with those of their corresponding formally specified models 301 and 305, generating alarm messages when significant discrepancies arise. These alarm messages are passed to an event correlator module 310 within the node 302.

Similarly, a model 315 of the Ethernet protocol layer and IP protocol layer 316 may be invoked for each other machine with which the node 302 is in current communication. An event comparator and alarm monitor 317 watches for significant deviations, such as repeated failures of a target to acknowledge a packet despite retries, between the expected behavior of the target and its actual behavior.

It is advantageous if at least some of the network nodes, such as router 320, are modified in a similar manner. For example, a router may have a formally specified model 321 of its own IP layer 322, with an event comparator and alarm monitor 323 observing deviations between expected and actual behavior. A router may have instances of a model 326 of each node's physical layer with which it communicates; similarly it may have models 327 of IP and TCP (not shown) layers, with an event comparator and alarm monitor 328 to track differences between reality and model behavior.

Alarm messages from the router's event comparators and alarm monitors 323 and 328 are transmitted to an event correlator 330, where they are filtered. Filtered alarms, with precise fault identification, are then addressed to the network management station 100 and passed through the router's TCP 331, IP 322, and an appropriate physical layer 332 for transmission. These alarms typically report symptoms, for example, a particular host may be unreachable, or all transmissions attempted over a link may fail to be acknowledged at the Ethernet level.

In the preferred embodiment, the local event correlator 310 or 330 is a rules-based correlation engine, that generally accepts the earliest and lowest level alarm caused by a fault as the root cause of the alarms. Since each layer supports the layer above it, the lowest layer reporting an alarm in a given communications context is the most likely source of the fault. The root cause as determined by these correlators is transmitted to the network management node 100 for further analysis and dispatch of repair personnel as needed.

Once formally specified and verified in a language, like Timed CSP or Verilog that supports concurrency, individual models, such as the model of the TCP layer 301 may be manually or automatically translated into an implementation language like C. In the preferred embodiment, the models 301, 305, 315, 316, 321, and 326 have been translated into C.

In a first alternative embodiment of a server according to the present invention, a model 400 (FIG. 4) of the interactions of a critical application 401 with the TCP-IP layers has also been constructed. This application model 400 is used in conjunction with an event monitor and comparator 402 to generate alarm messages should the critical application 401 fail.

Figure 4:
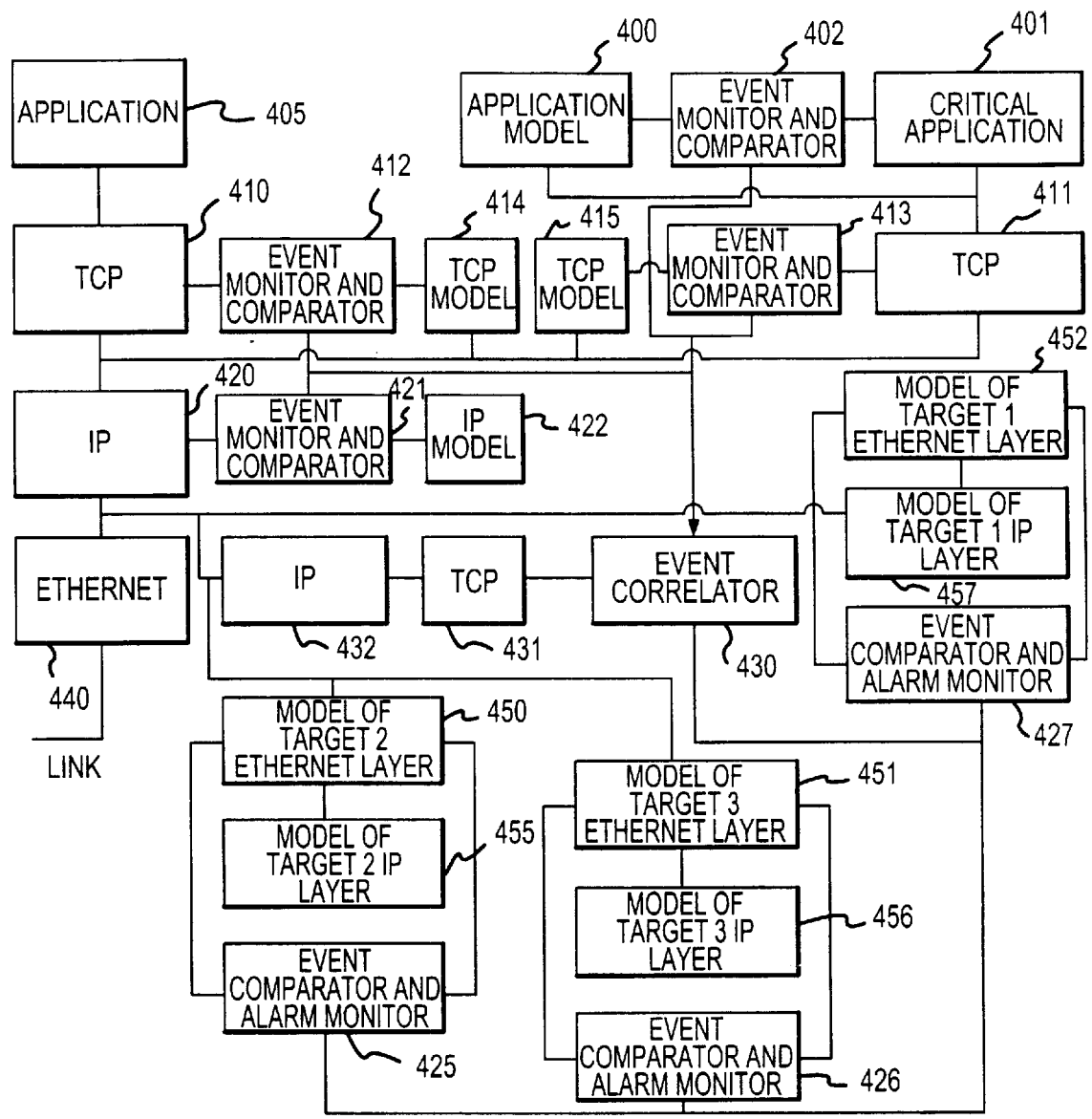
FIG. 4, a diagram illustrating a hierarchy of protocol processes running on a processor node, having a multiplicity of processes at certain levels, with multiple instantiations of formal models, alarm monitors for protocol layers, and an alarm filter as per the current invention.

In the alternative embodiment of FIG. 4, there is a plurality of applications running, application 405 is a separate application from critical application 401. In this case, each application may also have its own instances of the TCP protocol layer 410 and 411, TCP event monitor and comparator 412 and 413, and TCP models 414 and 415. This alternative embodiment is implemented on the Solaris™ (a trademark or registered trademark of Sun Microsystems, Inc. in the United States and other countries) multithreaded operating system, which also permits multiple instantiations of the IP layer as well as the TCP layer, so that a single server or router may appear at several IP addresses in the network. In this embodiment, a first IP layer 420 is monitored by an event monitor and comparator 421 and an IP model 422 for errors. Errors generated by all the internal event monitors and comparators 402, 413, 412, 421, and the target event comparators and alarm monitors 425, 426, and 427 are filtered by an Event Correlator 430, a separate instance of the TCP layer 431, and a separate IP layer 432, such that the server alarm monitor and control appears at a separate IP address from the applications 405 and 401. While it is anticipated that servers and routers will often have multiple network adapters, and hence multiple physical layer drivers, this particular embodiment has a single physical layer driver, here Ethernet layer 440.

The alternative embodiment of FIG. 4 also embodies a plurality of target physical layer models, here Ethernet layer models, 450, 451, and 452, and target IP layer models, 455, 456, and 457, organized as paired Ethernet and IP layer models. Each pair models the expected reactions of a machine or process on a machine with which the server is in communication; deviations from expected behavior also generate alarm messages that are fed to the local event correlator 430.

It is expected that the models, as with TCP model 414 and IP model 422, may be implemented as separate code and as a separate thread from the corresponding TCP and IP protocol layers 430 and 420. This is a nonintrusive implementation of the invention, in that the code for the TCP and protocol layers need not be modified for use with the invention.

In a second alternative embodiment, an intrusive implementation of the invention, code for TCP model 414 and IP model 422 are buried into the code of the corresponding TCP 410 and IP 420 protocol layers. This implementation is advantageous for speed, but requires that the code of the TCP and protocol layers, which are often components of the operating system, be modified.

In the alternative embodiment of FIG. 4, the Event Correlator module 430 also has a thread activated whenever TCP and LP protocol layer tasks are created or destroyed. When these layer tasks are created, the Event Correlator creates appropriate model tasks and configures them as required; and when these layer tasks are destroyed, the Event Correlator destroys the corresponding model tasks.

While the invention has been particularly shown and described with reference to a preferred embodiment thereof, it will be understood by those skilled in the art that various other changes in the form and details may be made without departing from the spirit and scope of the invention.

What is claimed is:
1. A network, comprising:
 a plurality of network nodes, where at least two of the plurality of network nodes further comprise:
  at least one process running on a node of the plurality of network nodes,
  at least one model of an additional process running on said node, wherein the model of the additional process is written in a formal specification language, and
  an alarm monitor comparing the apparent behavior of the model to actual events of the additional process;

a plurality of links, each link connecting a process of the at least one process on one of the plurality of network nodes to a process on another node, such that each of the plurality of network nodes is connected to at least one other of the plurality of network nodes; and at least one event correlation utility running on a node of the network for filtering alarms generated by the alarm monitors of the plurality of network nodes.

2. The network of claim 1, wherein the formal specification language is selected from the set consisting of Occam, Timed CSP, Verilog, and VHDL.

3. A network, comprising:
a plurality of network nodes, where at least two of the plurality of network nodes further comprise:
at least one process running on a node of the plurality of network nodes,
at least one model of an additional process running on said node, wherein the at least one model of an additional process running on said node comprises at least a first model and a second model, where the first model is a model of a layer of a communications protocol, and the second model is a model of a higher layer of the communications protocol, and
an alarm monitor comparing the apparent behavior of the model to actual events of the additional process;
a plurality of links, each link connecting a process of the at least one process on one of the plurality of network nodes to a process on another node, such that each of the plurality of network nodes is connected to at least one other of the plurality of network nodes; and
at least one event correlation utility running on a node of the network for filtering alarms generated by the alarm monitors of the plurality of network nodes.

4. The network of claim 3, wherein the communications protocol is TCP-IP, and wherein the layer of a communications protocol is an IP layer, and wherein the higher layer of the communications protocol is TCP.

5. The network of claim 3, wherein the layers of the communications protocol having corresponding models are a subset of a set of layers of communications protocol on the network nodes on which the models and their corresponding communications protocol layers run.

6. A network, comprising:
a plurality of network nodes, where at least two of the plurality of network nodes further comprise:
at least one process running on a node of the plurality of network nodes,
at least one alarm monitor for generating alarm messages, and
at least one event correlator for filtering the alarm messages, wherein the event correlator filtering includes determining a root cause of the alarm messages by processing the alarm messages;
a plurality of links, each link connecting a process of the at least one process on one of the plurality of network nodes to a process on another node, such that each of the plurality of network nodes is connected to at least one other of the plurality of network nodes; and
at least one event correlation utility running on a network management node of the network for further filtering alarm passed to the network management station by the plurality of network nodes.

7. The network of claim 6 wherein the at least two of the plurality of network nodes further comprise a model of at least one of the at least one process, wherein the model of the additional process is originally written in a formal specification language.

8. The network of claim 6 wherein the at least two of the plurality of network nodes further comprise a model of at least one of the at least one process, wherein the model of the process is coupled to at least one of the at least one alarm monitors, the alarm monitor being coupled to generate an alarm message when the process does not behave according to the model.

9. The network of claim 8 wherein at least one of the at least two of the plurality of network nodes further comprises an additional model of an additional process running on a node other than the node on which the model is run, wherein the additional model is coupled to an additional alarm monitor coupled to generate an alarm message when the additional process does not behave according to the additional model, the alarm message being filtered by the at least one event correlator prior to transmission to the a network management node of the network.

10. The network of claim 6, wherein the root cause determining includes identifying one of the alarm messages corresponding to a layer lower than other ones of the alarm messages, the layer being selected from a communication protocol and physical layer model.

11. A network, comprising:
a plurality of network nodes, where at least two of the plurality of network nodes further comprise:
at least one process running on a node of the plurality of network nodes,
at least one alarm monitor for generating alarm messages,
at least one event correlator for filtering the alarm messages, such that fewer alarm messages are passed to a network management node of the network than are generated by the at least one alarm monitor, and
a model of at least one of the at least one process, wherein the model is originally written in a formal specification language selected from the set consisting of Occam, Timed CSP, Verilog, and VHDL;
a plurality of links, each link connecting a process of the at least one process on one of the plurality of network nodes to a process on another node, such that each of the plurality of network nodes is connected to at least one other of the plurality of network nodes; and
at least one event correlation utility running on a network management node of the network for further filtering alarm passed to the network management station by the plurality of network nodes.

12. A network, comprising:
a plurality of network nodes, where at least two of the plurality of network nodes further comprise:
a first process running on a node of the plurality of network nodes,
a first alarm monitor for generating alarm messages, and
an event correlator for filtering the alarm messages, such that fewer alarm messages are passed to a network management node of the network than are generated by the first alarm monitor;
a plurality of links, each link connecting a process of the at least one process on one of the plurality of network nodes to a process on another node, such that each of the plurality of network nodes is connected to at least one other of the plurality of network nodes;
an event correlation utility running on a network management node of the network for further filtering alarm passed to the network management station by the plurality of network nodes; and a separate sub-network for transmission of alarm messages to the network management node of the network, and for transmission of network control messages from the network management node of the network to at least two of the plurality of network nodes;

wherein the at least two of the plurality of network nodes further comprise a first model of the first process, wherein the first model of the first process is coupled to the first alarm monitor, the first alarm monitor being coupled to generate an alarm message when the first process does not behave according to the model; and wherein at least one of the at least two of the plurality of network nodes further comprises a second model of a second process running on a node other than the node on which the model is run, the second model being coupled to a second alarm monitor that is coupled to generate an alarm message when the second process does not behave according to the second model, wherein the alarm message is filtered by the event correlator prior to transmission to the network management node.

13. A network, comprising:

a plurality of network nodes, where at least two of the plurality of network nodes further comprise:
  at least one process running on a node of the plurality of network nodes,
  means for modeling an additional process running on the other one of the at least two of the plurality of network nodes, and
  means for generating alarms when the means for modeling an additional process mismatches actual events of the additional process;

a plurality of links, each link comprising means for connecting a process of the at least one process on one of the plurality of network nodes to a process on another node, such that each of the plurality of network nodes is connected to at least one other of the plurality of network nodes;

means for transmission of alarms from the plurality of network nodes to a network management network node, wherein the means for generating alarms further comprises a local means for correlating events such that the alarms transmitted to the network management network node are filtered to indicate a root cause of a problem; and means for correlating the alarms running on the network management network node to filter alarms generated by the alarm monitors of the plurality of network nodes.

14. A network management method, comprising:

operating a plurality of protocol handlers in a network node to provide state information;

for each of the protocol handlers, creating a protocol layer model based on the state information;

comparing signals passed between the protocol handlers with expected signals in the protocol layer models;

generating an alarm message based on the signals comparing;

creating a model for an application running on the network node;

comparing signals passed to and from the application with the model; and generating an application alarm message based on the comparing.

15. The method of claim 14, wherein the protocol handlers comprise a TCP handler, an IP handler, and a physical layer handler.

16. The method of claim 14, further including creating a protocol layer model for each machine with which the network node is in communication, comparing expected behavior of each of the machines as defined in the model with actual behavior of each of the machines, and generating an alarm message based on the comparing.

17. A network management method, comprising:

operating a plurality of protocol handlers in a network node to provide state information;

for each of the protocol handlers, creating a protocol layer model based on the state information;

comparing signals passed between the protocol handlers with expected signals in the protocol layer models;

generating an alarm message based on the signals comparing; and determining a root cause of a plurality of the alarm messages by identifying a lowest of the alarm messages based on the protocol layer model and based on a sequential order of the generating of the alarm messages, whereby the lowest and earliest of the alarm messages is accepted as the root cause.

18. A network management method, comprising:

operating a plurality of protocol handlers in a network node to provide state information;

for each of the protocol handlers, creating a protocol layer model based on the state information, wherein the creating includes specifying and verifying the model in a formal specification language;

comparing signals passed between the protocol handlers with expected signals in the protocol layer models; and generating an alarm message based on the signals comparing.

19. The method of claim 18, wherein the formal specification language is selected from the group consisting of Occam, Timed CSP, Verilog, and VHDL.

* * * * *